Patented Aug. 25, 1953

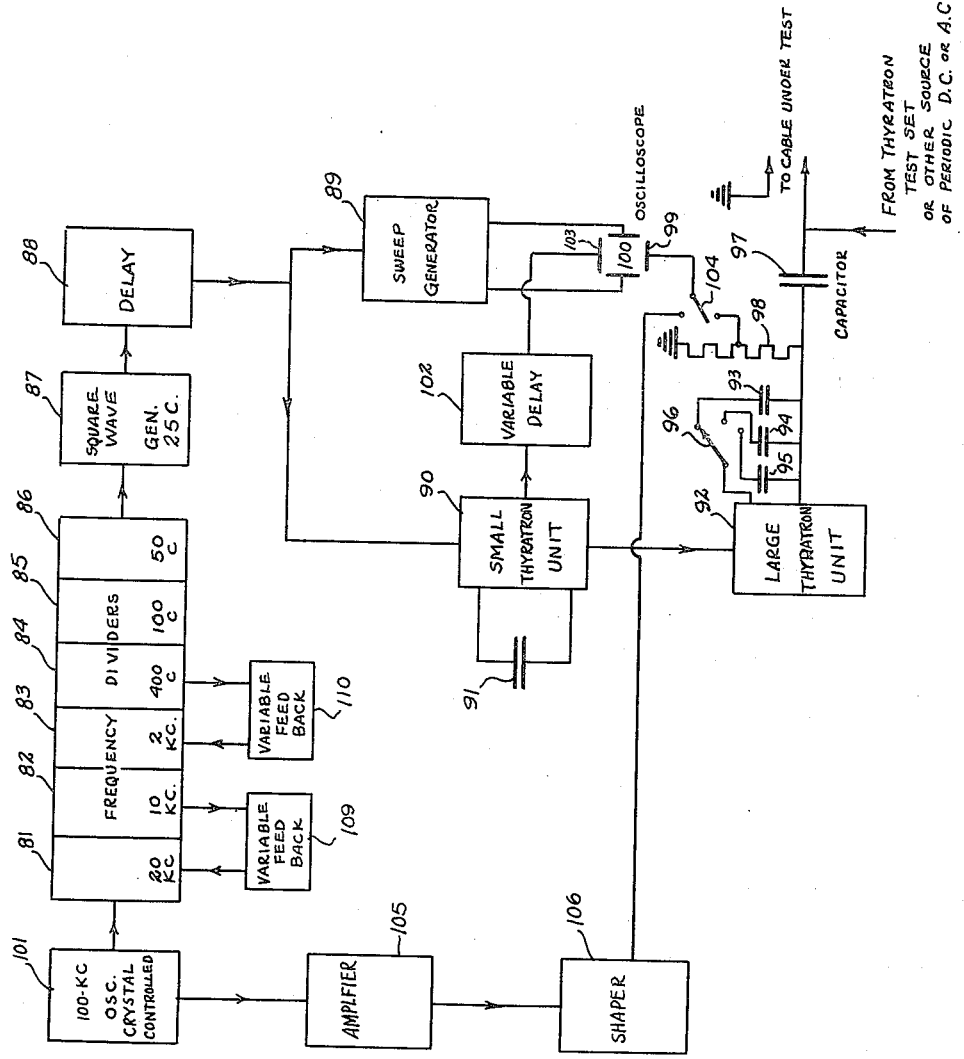

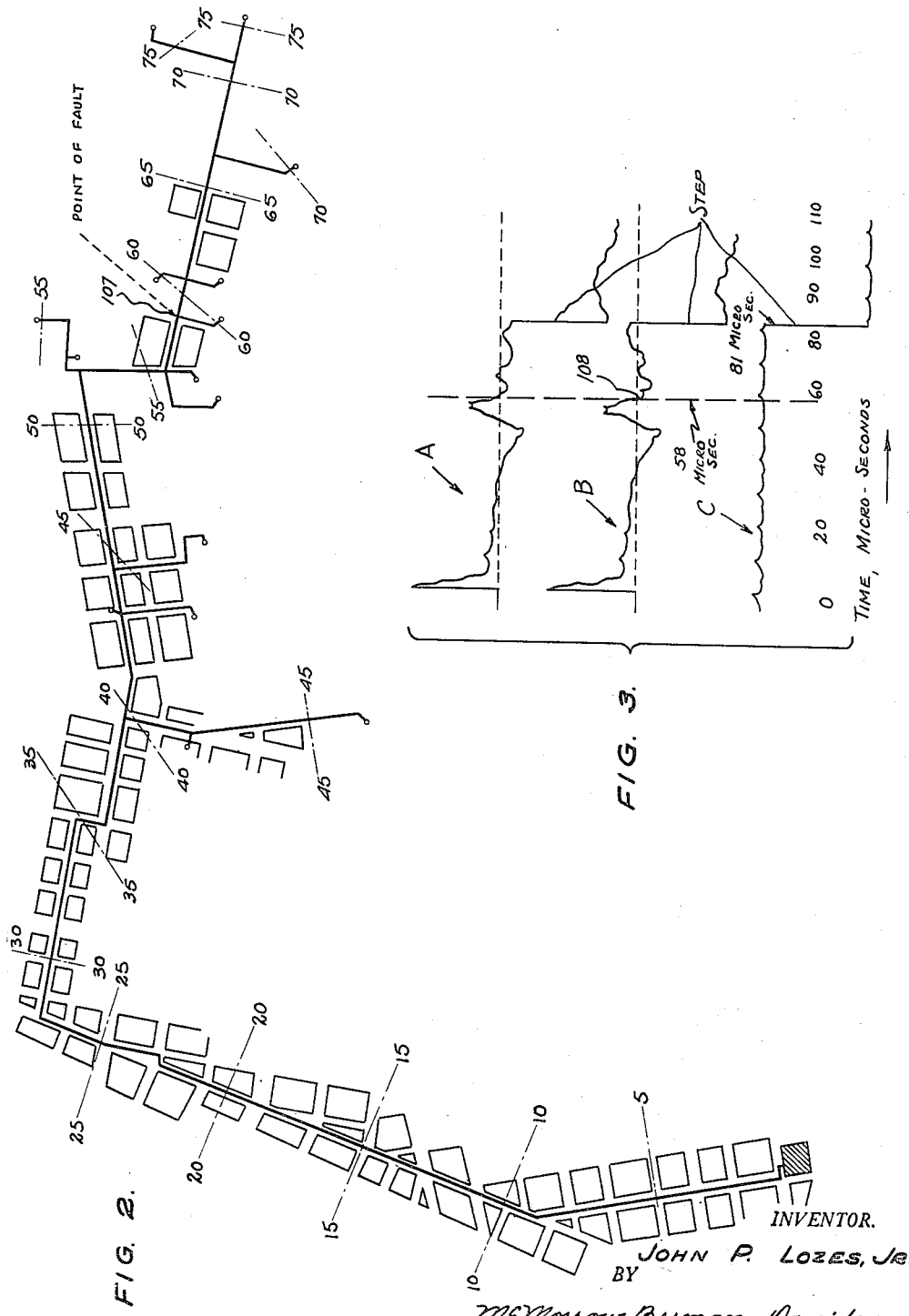

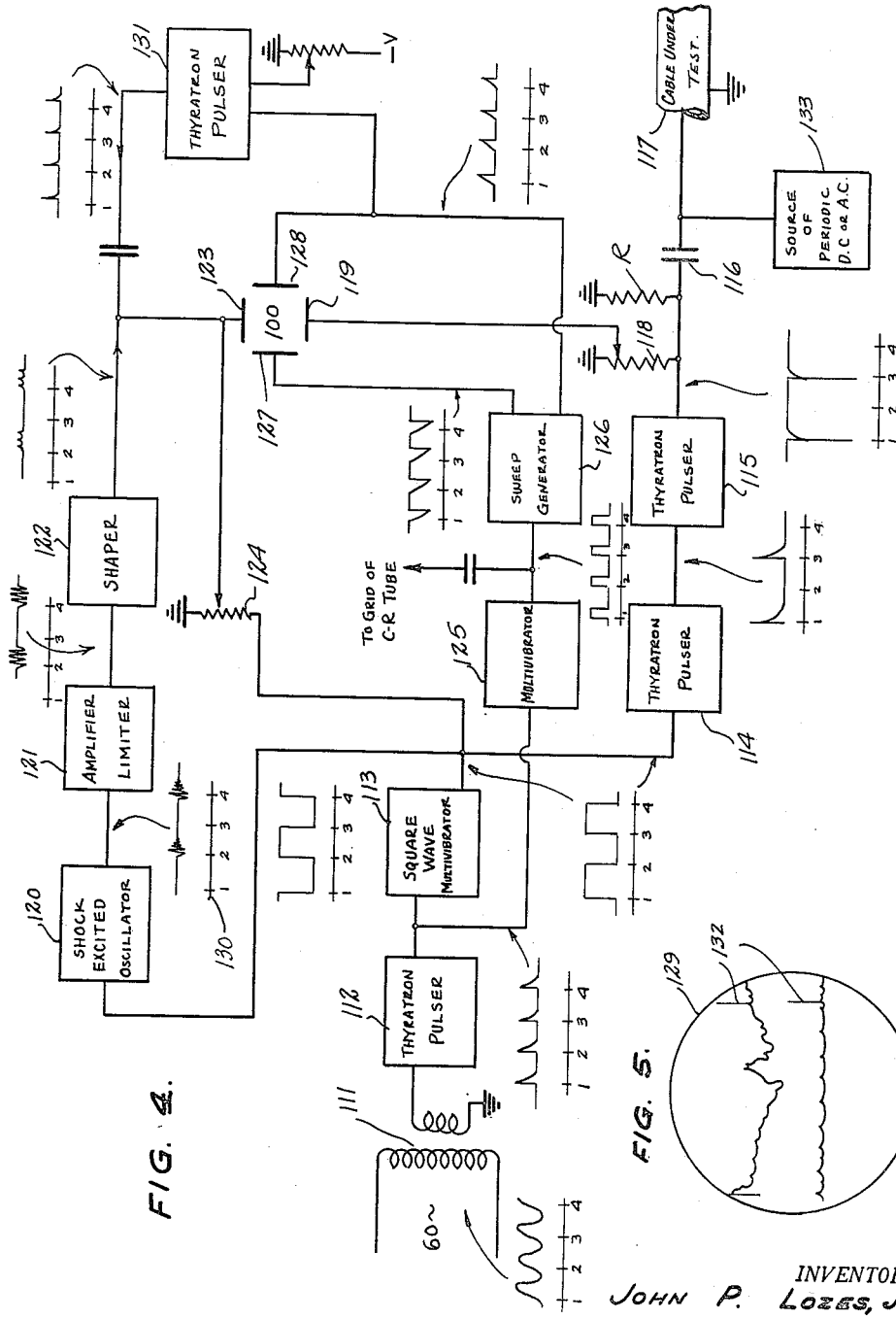

2,650,345

UNITED STATES PATENT OFFICE 2,650,345

APPARATUS FOR LOCATING CABLE FAULTS

John P. Lozes, Jr., New Orleans, La.

Application March 29, 1949, Serial No. 84,163

6 Claims. (Cl. 324—52)

1

This invention relates to testing cables and the like, and more particularly to an improved apparatus for locating faults on various types of lines by the surge-reflection principle.

A main object of the invention is to provide a novel and improved system for locating faults in cables and the like which is very simple, requires very little power and is accurate in operation.

A further object of the invention is to provide an improved apparatus for locating faults on almost any type of line, which operates on the surge-reflection principle, requires inexpensive apparatus, provides an accurate indication of the location of the fault, and which greatly reduces the amount of time and labor required to locate the faults.

A still further object of the invention is to provide an improved means for locating faults in cables and the like by the surge-reflection method, whereby the fault may be accurately located even when the fault is not a dead short, the detection of the fault being accomplished by the method and means of the present invention without the use of extremely high voltages and requiring no high degree of skill on the part of the operator.

A still further object of the invention is to provide an improved apparatus for locating faults in cables and the like by the surge-reflection method, the apparatus being relatively inexpensive to construct, being easy to operate, and enabling the fault to be quickly and accurately located by a few simple manipulations of the controls of the apparatus.

Further objects and advantages of the invention will become apparent from the following description and claims, and from the accompanying drawings, wherein:

Figure 1 is a block diagram illustrating one form of cable fault-detecting apparatus constructed in accordance with and utilizing the method of the present invention;

Figure 2 is a map of a typical feeder cable calibrated in microseconds and showing the location of a fault;

Figure 3 illustrates typical traces on the oscilloscope screen of the apparatus of Figure 1, respectively showing the trace of the feeder cable of Figure 2 in operative condition, the trace of the same feeder cable in faulted condition, and the trace providing marker pips every ten microseconds;

Figure 4 is a block diagram illustrating another form of cable fault-detecting apparatus in accordance with the present invention;

2

Figure 5 illustrates the appearance of a typical trace obtained on the screen of the oscilloscope tube of the apparatus of Figure 4.

When a surge is applied to a transmission line it travels down the line until it meets a change in the characteristic of the line, such as an open circuit, a short circuit, or any other change in the $Z_0$ (surge impedance) of the line, and is then reflected. In accordance with the present method, small surges of about 3,000 volts are applied to the line and the time elapsing between the initial surge and correct reflection as read from an oscilloscope is correlated with the cable length.

Figure 1 shows a block diagram of one form of testing system employed in accordance with the present invention. Calibration for a typical underground feeder is shown in Figure 2. A complete wave obtained from applying the pulse to this feeder in normal operating condition is shown in Figure 3 at A.

As shown in Figure 1, 101 designates a 100 k. c. oscillator which is crystal controlled. The output of oscillator 101 is fed through six frequency dividers shown respectively at 81 to 86, providing a 50-cycle signal at the output of the last frequency divider 86. This 50-cycle signal triggers a square wave generator, shown at 87, which provides a 25-cycle square wave at its output. The leading edge of the square wave goes through a fixed delay circuit, shown at 88, and then triggers the sweep generator, shown at 89. It also fires a small thyratron, designated at 90, through which a condenser, shown at 91, discharges. The wave produced by thyratron 90 fires a larger thyratron, shown at 92, discharging a previously-charged condenser 93, and producing a 3000-volt pulse.

No attempt is made to shape the pulse, but rather the exponential decay of a condenser discharged across a resistor is used. Various-sized condensers may be employed in place of condenser 93, as shown at 94 and 95, a selector switch 96 providing a means of switching the condensers individually into the circuit. This is a desirable feature, for this provides a choice of several different time constants. With a short-time constant, reflections will be obtained from many discontinuities, whereas, with a long-time constant, only the relatively major discontinuities will show on the screen.

The cable under test, where the pulse is applied, is connected through a capacity 97 and a potentiometer 98 to one of the vertical plates 99 of the oscilloscope shown at 100. The potentiometer 98 is of such value of resistance as to properly terminate the cable. Thus, the initial pulse and the reflections are made to appear on the trace of the oscilloscope. The output of a variable time delay circuit, shown at 102, triggered by the same pulse that triggers the sweep generator 89, is applied to the other vertical plate of the oscilloscope, shown at 103. This puts a step in the trace, which can be positioned at any of the reflections appearing along the trace by varying the delay of circuit 102. The step is shown positioned, for example, at 81 mircoseconds in Figure 3.

By means of a selector switch, shown at 104, the original pulse and the reflections can be disconnected from vertical plate 99, and in place thereof, the output signal of the 100 kc. oscillator 101, after passing through an amplifier 105 and a pulse shaper 106, can be applied to said vertical plate. Since the variable delay circuit 102 is connected to vertical plate 103, the resultant wave appears as the trace shown at C in Figure 3. Since the pulses provided by shaper 106 have the same frequency as oscillator 101, trace C has marker pips exactly 10 microseconds apart, and it is a simple matter to count them to the step. Since the 100 kc. oscillator is stable in frequency, the 10-microsecond pips are stationary along the trace.

Although the horizontal sweep is triggered at the rate of 25 cycles per second, by the output of the square wave generator 87 of Figure 1, the sweep generator 89 is of the triggered and gated type, namely, of conventional design, in which the sweep length may be varied to any value desired, and whereby the electron beam in the cathode ray tube may be turned on only when the sweep is in progress. Thus, if the sweep length were set to 80 microseconds, 8 marker pips 10 microseconds apart would appear on the screen.

It takes about 20 microseconds for a wave to travel down and back over a mile of cable. Therefore, the distance between two of the marker pips represents about a half-mile. With this scheme it is easy to estimate the location of cable faults to one microsecond, or 1/20 of a mile, about 265 feet. Tests show that the pulse actually travels about 220 feet per microsecond as measured along the surface of the ground, that is, without taking into consideration the cable racked in manholes.

In using the apparatus, it is only necessary to (1) find a new reflection (one that did not appear when the cable was in normal operating condition), (2) position the step to this reflection by means of the controls of variable delay circuit 102, (3) operate switch 104 to connect vertical plate 99 to the output of shaper 106, and (4) count off the number of microseconds to the step (and consequently to the fault). Using a map of the feeder previously calibrated in microseconds, such as the map shown in Figure 2, the approximate location of the fault can be found immediately if the cable is a transmission feeder. If the cable is a distribution feeder, such as a network feeder, the fault can be placed within about three locations.

For example, Figure 2 shows a fault at 107. Comparing the trace B with the known normal trace A of the feeder, it is noticed that a difference in shape occurs at 108. By moving the step to this position and then switching on the trace C, the number of marker pips to this position may be determined. From trace C of Figure 3 it will be seen that the step will be located at a position corresponding to 58 microseconds. Referring to the calibrated feeder map, Figure 2, the point of the fault may be placed between the 55-microsecond and 60-microsecond calibrations at a point on the feeder corresponding to 58 microseconds. Of course, if there are branches of the feeder falling within this calibrated range, similar possible fault points on the branches require investigation.

An important requirement of this type of testing system is to ensure that the fault produces a clear change in the normal trace of the cable, so that it can be spotted. It is well known that a fault on a cable is rarely a dead short. A fault with low voltage applied may measure 5,000 to 10,000 ohms, even though it is well carbonized. Since the surge impedance of a cable is about 60 ohms, 5,000 ohms across it, or even 500 ohms, does not change the characteristic appreciably at that point, and, therefore, no reflection takes place. Only when a relatively high voltage is applied does the fault arc, and the apparent "resistance" fall to zero. Voltages of about 4,000 to 6,000 volts D. C. are often required to start an arc through a carbonized fault in 13 kv. cable.

To avoid the use of extremely high voltage and to facilitate detecting the change in the reflected wave caused by a fault, the 3,000-volt test surges are superimposed on half-second D. C. pulses. The D. C. pulses are produced by a thyratron set capable of delivering either 10,000 volts at zero amperes or five amperes at zero volts, there being 100% regulation. Such a thyratron set is normally employed to provide a direct current indication along the cable which a trouble shooter searching for the fault "picks up" at successive manholes along the cable, progressing until he no longer receives a current indication. Superimposing the shorter surge pulses, approximately three microseconds in duration, in no way interferes with this work, and the high voltage D. C. may still be employed to narrow the location of the fault down to its ultimate position.

With the D. C. pulse off, the trace on the screen is the same as if the cable were not faulted (see curve A in Figure 3), since the resistance of the fault usually is much higher than the surge impedance of the cable. But when the high voltage D. C. pulse from the thyratron test set is applied, the fault arcs over, its "resistance" goes to zero, and the 3-microsecond test pulses applied twenty-five times per second show a reflection due to the discontinuity caused by the short circuit. Thus, the trace is the same as if the cable were metallically shorted at the point of the arc. (See curve B in Figure 3.) With the high voltage D. C. pulses cycling on and off, a continuously alternating trace is seen on the screen. By adjusting the step in the trace to the first point along the trace where a change can be noticed (as by comparing curves A and B of Figure 3) and throwing the switch 104, the time in microseconds corresponding to the location of the fault can be read from the curve C of Figure 3. Although the step is shown at 81 microseconds in Figure 3, by the above operation it would have been moved over to line up with the fault at about 58 microseconds. Referring to the calibrated map of the cable, such as shown in Figure 2, the points likely to be faulted are readily determined.

The high voltage D. C. pulses from the thyratron test set are preferably about one-half second in duration and may have any frequency of recurrence sufficiently low to allow comparison of the respective traces showing apparently normal and faulted cable conditions. It has been found that accurate results may be obtained with the high voltage pulse cycled one-half second on and one and one-half seconds off.

If so desired, the high voltage D. C. may be applied continuously. As above explained, superimposing the shorter 3-microsecond surge pulses in no way interferes with the effect provided by the high voltage D. C.

Under certain circumstances, unwanted deflection of the beam of the oscilloscope may occur, for example, due to strong magnetic fields present at a generating station when the equipment may be used. With equipment such as illustrated in Figure 1, the sweep of the beam must be synchronized with the generator frequency, as by changing the feed-back of the frequency divider stages. For this purpose, variable feed-back circuits are employed capable of changing the frequency of the various frequency dividers 81, 82, 83, 84, 85, 86 to such an extent as to cause the frequency of the square wave generator to be varied from 25 to approximately 31 cycles. These feedback circuits are shown at 109 and 110 in Figure 1. Said feed-back circuits are conventional in construction and are similar to the feedback circuits employed in the AN/APN-4 Loran Indicator. However, in many cases, just as this result is obtained, a large block of load is applied to or removed from the system, changing the generator frequency, and causing the trace to move around the screen.

To overcome this difficulty, the oscilloscope sweep generator may be triggered directly for the 60-cycle line. At the same time, a shock-excited oscillator may be employed to provide the marker pips in place of the 100 kc. crystal-controlled oscillator. The marker pips would then be stationary, for the oscillator would then be triggered at the same moment as the sweep generator. Figure 4 illustrates in block form a circuit device to accomplish this result.

In Figure 4, the 60-cycle station frequency, through the transformer 111, trips the thyratron pulser 112 once each cycle. The output of the pulser 112 trips the square wave multivibrator 113, causing square waves to be generated at a fundamental frequency of half the station frequency. When the output of the multivibrator 113 goes in the positive direction, the thyratron pulser 114 fires in turn the larger thyratron pulser 115, forming a negative pulse which is applied through the capacitor 116 to the cable under test, shown at 117. The resistor R is of such value as to properly terminate the cable 117. The output pulse and all reflected pulses from the cable 117 are applied across the potentiometer 118. These pulses and reflections are thus applied to the vertical deflection plate 119 of the oscilloscope 100 at the proper magnitude.

When the output of the multivibrator 113 goes negative the shock-excited oscillator 120 goes into oscillation. These oscillations are all amplified to a common magnitude in the amplifier limiter 121, and shaped into marker pips in the shaper 122. These marker pips are applied to the other vertical deflection plate 123 of oscilloscope 100. The output of the square wave multivibrator 113 is also applied through potentiometer 124 to the vertical deflection plate 123, causing each alternate trace of the oscilloscope to be above or below its predecessor.

The output of the thyratron pulser 112 also triggers a multivibrator 125. This multivibrator 125 puts out a square-topped pulse of variable length which, when applied to the grid of the cathode ray oscilloscope tube 100, turns on the beam of the tube, and when applied to the sweep generator 126, triggers said generator and determines the length of the sweep. The output of the sweep generator 126 is applied to the horizontal deflection plates 127 and 128, sweeping the electron beam across the tube.

Since the sweep generator 126 fires each cycle of the station frequency and since the square wave multivibrator 113 has an output to one of the vertical deflection plates 123 at a fundamental frequency of half station frequency, two traces are seen on the tube face, one above the other, as shown in Figure 5 at 129.

The voltage applied to the horizontal deflection plate 128 is also applied to a thyratron pulser 131, which applies a short reference pulse 132 to both traces. These reference pulses 132 can be applied anywhere along the sweep, and are the same distance along each sweep from the start of the sweep. Thus, if the reference pulse 132 were positioned at the point on the top trace where a discontinuity was apparent, the reference pulse 132 on the bottom trace would show the distance to the discontinuity if the marker pips are correctly calibrated.

The various wave shapes at the various points of the circuit are shown in the block diagram of Figure 4. The crossed lines 130 under the wave shapes are time markers inserted on the diagram for convenience in visualizing the time relationship of one wave shape with another.

It will be noted that each of the cross line markers in the crossed lines 130 represents one-sixtieth of a second interval, the crossed lines being one-sixtieth of a second apart, since the input to the transformer 111 is of 60 cycle frequency. It is also to be noted that the sweep generator 126 is also of the gated type, as is the sweep generator 89 in Figure 1, and that the sweep inputs to the horizontal deflection plates 127 and 128 are only for a short portion of the one-sixtieth of a second period. Actually in the instrument, sweep lengths would be of the order of 50 to 200 microseconds and the cathode ray tube electron beam would only be gated "on" for this same time. If the length of sweep were 90 microseconds and the shock-excited oscillator 120 oscillated at 100 kilocycles, then the output of the shaper 122 would be pips 10 microseconds apart, of which 9 would appear on the face of the cathode ray tube. In drawing the wave shapes of the output of the shaper 122 it is obviously impractical to show more than about three pips and still be able to show the spacing between "bursts." The actual number of pips in each "burst" would depend on the Q of the circuit of the shock-excited oscillator 120. This oscillator can easily be made to oscillate 40 or 50 times at 100 kilocycles in each "burst." Obviously, the wave shape shown adjacent the shaper 122 in Figure 4 is only roughly approximate and the linear extent of each "burst" is exaggerated.

The source of periodic high voltage is shown at 133. This can be a source of either D. C. or A. C. The only requirements are that the voltage output be high enough to start an arc across the cable fault, and that the internal impedance of the source be high enough to limit the current to the ratings of the components of the source.

The purpose of the periodic voltage provided by source 133 is to hold an arc across the fault at the time the current is on so that an effective short circuit will be obtained across the fault, whereby the pulses produced by the thyratron pulser 115 may be reflected by the fault.

The system described above has other possible applications besides use with power cables. For example, the system may be employed to locate holes in the insulation of buried pipe lines. These pipe lines are usually covered by said insulation before being placed in the ground. It is important to have no holes in this coating, for holes will lead to corrosion or electrolysis attack of the pipe. This pipe, covered with insulating material and installed in the ground, has many of the characteristics of a power cable, and the apparatus described above may be employed to locate points at which holes are present in the insulating material.

While certain specific embodiments of fault-testing systems for cables and the like have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Means for locating faults in a cable by the pulse-reflection method comprising an oscilloscope having horizontal and vertical deflection plates, a source of constant-frequency direct-current pulses, a sweep generator connected to said horizontal plates, means triggering said sweep generator from said source, a pulse-forming network connected to said vertical plates, means triggering said pulse-forming network from said source, a variable delay circuit connected to said vertical plates, means triggering said variable delay circuit from said pulse-forming network, means connecting the output of said pulse-forming network to said cable, and a source of relatively low frequency periodic high voltage connected to said cable.

2. Means for locating faults in a power cable by the pulse-reflection method comprising an oscilloscope having horizontal and vertical deflection plates, a source of direct-current pulses synchronized in frequency with the frequency of the cable power voltage, a sweep generator connected to said horizontal plates, means triggering said sweep generator from said source, a first pulse-forming network, means triggering said pulse-forming network from said source, a variable delay circuit connected to said vertical plates, means triggering said variable delay circuit from said pulse-forming network, a second pulse-forming network triggered from said source, means connecting the output of said first pulse-forming network to said cable, means for selectively connecting the first and second pulse-forming networks to said vertical plates simultaneously with said variable delay circuit, and a source of low-frequency periodic high voltage connected to said cable.

3. Means for locating faults in a power cable by the pulse-reflection method comprising an oscilloscope having horizontal and vertical deflection plates, a source of direct-current pulse synchronized in frequency with the frequency of the cable power voltage, a sweep generator connected to said horizontal plates, means triggering said sweep generator from said source, a first pulse-forming network connected to said vertical plates, means triggering said pulse-forming network from said source, a second pulse-forming network triggered from said source and connected to said vertical plates, a variable pulser connected between one of the horizontal plates and one of the vertical plates, means connecting the output of said first pulse-forming network to said cable, and a source of low-frequency periodic high voltage connected to said cable.

4. An apparatus for locating faults in an underground member comprising means for intermittently impressing a relatively high voltage on the member, means for continuously impressing short periodically-spaced direct current pulses on the member, an oscilloscope screen, and means for impressing on said screen against a common time scale the respective wave forms of the voltage on the member at the input thereto during the periods when said high voltage is on and during the period when said high voltage is off, whereby the respective wave forms may be visually compared and whereby the time values corresponding to differences in said wave forms may be determined.

5. An apparatus for locating faults in a cable having a partial short circuit therein comprising means for periodically impressing a relatively high voltage on the cable to cause the partial short circuit to arc over, means for continuously impressing short periodically-spaced direct current pulses on the cable, an oscilloscope screen, and means for impressing on said screen against a common time scale the respective wave form of the voltage on the cable at the input thereto during the periods when said high voltage is on and during the periods when said high voltage is off, whereby the respective wave forms may be visually compared and whereby the time value corresponding to the difference in shape of said wave forms may be determined.

6. An apparatus for locating faults in an alternating current power-feeder cable comprising means for periodically impressing a relatively high voltage on the cable, means for continuously impressing short periodically-spaced direct current pulses synchronized with the alternating current power frequency on the cable, an oscilloscope screen, and means for impressing on said screen against a common time scale the respective wave forms of the voltage on the cable at the input thereto during the periods when said high voltage is on and during the periods when said high voltage is off, whereby the respective wave forms may be visually compared and the time value corresponding to the differences in shape of said wave forms may be determined.

JOHN P. LOZES, JR.

References Cited in the file of this patent

UNITED STATES PATENTS

| Number | Name | Date |
| --- | --- | --- |
| 2,315,450 | Nyquist | Mar. 30, 1943 |
| 2,345,932 | Gould | Apr. 4, 1944 |
| 2,418,364 | Moe | Apr. 1, 1947 |
| 2,420,516 | Bischoff | May 13, 1947 |
| 2,430,570 | Hulst | Nov. 18, 1947 |
| 2,493,800 | Biskeborn | Jan. 10, 1950 |

OTHER REFERENCES

Article, entitled "Improved Surge-Reflection System Locates Cable Faults" by Lozes in Electrical World, November 6, 1948, pages 89, 90 and 91.